Patented Mar. 19, 1929.

1,705,827

UNITED STATES PATENT OFFICE.

FRANCIS G. RAWLING, OF MADISON, WISCONSIN.

METHOD OF PULPING WOOD.

No Drawing.   Application filed September 17, 1927. Serial No. 220,237.

This invention relates to the treatment of wood for the production of pulp.

In pulping processes which employ mixtures of sodium sulphite and weak alkalis or the sodium salts of weakly ionized polybasic acids in aqueous solution for the pulping or softening of wood, the best results, as regards the strength and light color of the pulp, are obtained if the solutions are maintained as nearly neutral as possible. There are, however, several factors which cause such solutions to deviate from neutrality.

The sodium sulphite solution enables certain organic acids to be removed from the wood, particularly at temperatures between 110° C. and 120° C. These acids include a quantity of acetic acid, sometimes as much as 5 per cent by weight on the wood. In order to maintain neutrality in the reacting solution, enough alkaline substances must be present to combine with these acids. These substances should not, however, be strong enough to cause an alkaline reaction in the liquid. Sodium bicarbonate is an example of such an alkaline substance capable of reacting with acetic acid. Its solution in water at room temperature is not alkaline to phenolphthalein.

The use of a weak alkali for the purpose of combining with the acids liberated from wood at 120° C., is not sufficient to maintain a neutral solution. For example, a solution of sodium bicarbonate is neutral at room temperature, but at temperatures above 70° C., it becomes alkaline to phenolphthalein. Sodium sulphite itself is alkaline to phenolphthalein when its aqueous solution is heated to boiling. Since it is believed that in the pulping processes in question, either a condition of too great an alkalinity or of acidity is detrimental to the quality of the pulp, it will be necessary to prevent the increase in alkalinity due to the rise in temperature of the solutions, as well as to neutralize organic acids as rapidly as they are formed.

In the new method of softening wood, the solutions of sodium sulphite and the sodium salts of weakly ionized polybasic acids are maintained neutral by the addition of carbon dioxide. In the presence of excess of carbon dioxide, any alkali formed by hydrolysis of the sodium salts, is neutralized and the alkalinity destroyed.

The hydrolysis of a typical sodium salt $Na_2R$, where R is a weak dibasic acid radical, is shown in the equation

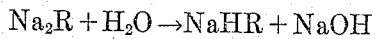
$$Na_2R + H_2O \rightarrow NaHR + NaOH$$

in which caustic soda is produced.

On addition of carbon dioxide it combines with the caustic soda and the alkalinity is removed,

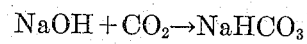
$$NaOH + CO_2 \rightarrow NaHCO_3$$

since sodium bicarbonate is neutral in aqueous solution.

An excess of carbon dioxide does not produce undersirable acidity since it is not very soluble in water, and its solution is only ionized to a very small degree.

The reaction with sodium sulphite may be expressed as follows:

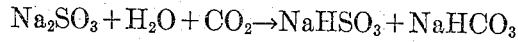
$$Na_2SO_3 + H_2O + CO_2 \rightarrow NaHSO_3 + NaHCO_3$$

in which the carbon dioxide represses the tendency of the solution to become alkaline as the temperature is raised.

When the temperature of the solution rises above 80° C., it will be necessary to use closed vessels and maintain a pressure in them above atmospheric in order to retain enough carbon dioxide in solution.

The presence of carbon dioxide does not interfere with the reaction between the bicarbonate and the organic acids produced from the wood. The net result is the neutralization of the acids and an increase in pressure in the closed vessel, due to the formation of further quantities of carbon dioxide.

The reaction between an excess of carbon dioxide and any sodium salt of a weakly ionized polybasic acid may be summarized in the following equation where "R" is the acid radical and "n" is the basicity of the acid:

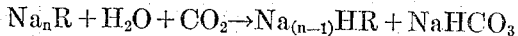
$$Na_nR + H_2O + CO_2 \rightarrow Na_{(n-1)}HR + NaHCO_3$$

The typical compound $Na_{(n-1)}HR$ may suffer further hydrolysis to $Na_{(n-2)}H_2R$, with the production of more sodium bicarbonate. As a rule the first hydrolysis is not very marked, and the second one is practically insignificant. In every case, however, sodium bicarbonate is formed.

The new method of softening or pulping wood consists in treating the woody material under pressure with solutions containing sodium sulphite, sodium salts of weakly ionized polybasic acids and an excess of carbon dioxide, at temperatures above atmospheric and below 190° C.

For example, aspen or gum wood is chipped in the usual manner of the chemical pulp industry, and is charged into a steel digester with a solution containing 80 grams of sodium sulphite, 30 grams sodium bicarbonate and 3 grams of carbon dioxide per litre. After the digester is closed, the contents may be heated by the addition of steam. More carbon dioxide may be introduced either by the addition of the gas itself, or in admixture with steam, such as the relief from a second digester. Since the carbon dioxide exerts a pressure of itself in the digester above that caused by steam in equlibrium with water at the same temperature, this excess pressure may be used as a measure of the amount of carbon dioxide present, and if desired, some of the carbon dioxide and steam may be released from the digester if the pressure exceeds a predetermined limit. The released steam and carbon dioxide may be stored or used to charge another digester with carbon dioxide or for the addition of carbon dioxide to the cooking solution.

To facilitate impregnation of the wood by the chemical solution, the chips may be steamed before the addition of the chemical solution.

In the heating of the digester, the temperature will rise steadily, and with it, the pressure, which is due both to the aqueous tension of the solution and to the carbon dioxide, which tends to come out of solution. At 100° C. it is possible to have a gauge pressure of 40 pounds per square inch. As the temperature approaches 115°–120° C., organic acids are liberated from the wood, which combine with the sodium bicarbonate in solution, and cause the production of more carbon dioxide. It is possible that the pressure will increase beyond a safe limit for the digesting apparatus or a desired amount found by actual test to be suitable for the production of the grade of pulp desired, in which case some of the carbon dioxide is released with steam from the digester. When the temperature has attained 125° C. or so, the bulk of the organic acids have been produced from the wood. The cooking of the wood may be completed either by heating the digester to 185° C. for pulping, with or without the release of cooking liquor, or the wood may be softened but not pulped by the removal of the cooking liquor from the digester as much as can conveniently be done by draining, at temperatures around 125° C., but above that range in which the organic acids are liberated from the wood, and heating the residue of wet chips in the digester to temperatures up to 170° C. In the latter case, the pulping of the softened chips is completed mechanically by beating, grinding, or other disintegrating method.

The liquid released from the digester at 125° C. or so, contains sodium sulphite, sodium bicarbonate, carbon dioxide and organic sodium salts as well as organic compounds of unknown chemical constitution. This liquid may be fortified by the addition of sodium sulphite and sodium bicarbonate, for reuse in succeeding cooks. Thus the supply of carbon dioxide is maintained from cook to cook by the reaction of the organic acids and the sodium bicarbonate, and by the transfer of relief gases from one digester to a succeeding one, and by the use of a relief liquor for making cooking liquors.

By this invention is it now proposed in the cooking process to maintain a sufficient excess of carbon dioxide in the cooking liquors to repress alkalinity such as might be due to the hydrolysis of sodium salts of weakly ionized polybasic acids.

Attention is directed to the use of carbon dioxide in pulping processes, as described in the application for patent filed by the applicant hereof jointly with Messrs. Rue, and Wells Serial No. 100,685, filed April 8, 1926, entitled "Treatment of wood for the production of pulp", and which application provided for the generation of carbon dioxide and the regulation of alkalinity by release of suitable amounts of carbon dioxide and steam during the boiling period. This present invention differs specifically, as indicated in the foregoing, and also in the feature that the initial charge includes previously prepared carbon dioxide and thus the operation does not depend on the generation of carbon dioxide before its beneficial effect can be invoked.

For example, the color of the pulp obtained from the colored woods, chestnut, jack pine and tulip tree is much whiter if carbon dioxide is present in the cooking liquors initially than in its absence, other conditions of cooking being substantially the same. Since carbon dioxide is formed at temperatures around 115° C. by the reaction of organic acids liberated from the wood and the sodium carbonate, but not below these temperatures, the control of alkalinity in the cooking liquor is difficult between temperatures of 50° C. and 115° C. unless carbon dioxide is added to the cooking liquor, so that it produces a pressure which can be regulated to any desired amount. Although a high alkalinity produces a brown pulp, it is not known by what chemical changes this color is developed, since the chemical constitution of the various constitutents of wood is still to be determined.

I claim:

1. The process of pulping wood which consists of treating it with solutions containing sodium sulphite, the sodium salt of a weakly ionized polybasic acid and an excess of carbon dioxide under temperatures up to 190° C.

2. The process of pulping wood which consists of treating it with solutions containing sodium sulphite, sodium bicarbonate and an excess of carbon dioxide under temperatures up to 190° C.

3. The process of pulping wood which consists of treating it with solutions containing sodium sulphite, sodium bicarbonate and an excess of carbon dioxide, up to temperatures of 125° C., and withdrawing the excess of solution from the woody material after the neutralization of the bulk of the organic acids, heating the woody residues to higher temperatures to soften them further, and using the excess solution containing carbon dioxide withdrawn from the digester in the preparation of further amounts of treating solution.

4. In a process of pulping wood, the step of maintaining the excess of carbon dioxide in the vessel in which the wood is treated with solutions containing sodium sulphite, sodium bicarbonate and carbon dioxide, by the use of the steam and carbon dioxide from a previous cook.

5. In a process of pulping wood, the step of maintaining the amount of excess carbon dioxide in the digesting vessel by suitable release of carbon dioxide and steam to conform to a desired gauge pressure or series of pressures which might be plotted against time in a graph describing a cooking procedure.

6. The process of manufacturing wood pulp which comprises treating wood so as to dissolve the intercellular material without materially decomposing the ligno cellulose content of the wood by first subjecting the wood to a chemical treatment consisting of digesting it with a non-acid aqueous solution containing a sulphite and a weak alkali capable of producing carbon dioxide during the period of digestion, providing a charge of carbon dioxide in the initial digestion mixture, boiling the wood and chemicals under pressure greater than atmospheric pressure and in a condition of non-acidity during which boiling treatment carbon dioxide gas is formed, and secondly subjecting the woody material thus treated to a mechanical separating action wherein the fibers from which the intercellular material has been dissolved out by the digesting treatment are separated into pulp.

7. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with a non-acid aqueous solution containing a sulphite and an alkali capable of producing carbon dioxide during the period of digestion, providing a charge of carbon dioxide in the initial digestion mixture, and boiling the wood and chemicals under pressure and in a condition of non-acidity during which boiling treatment carbon dioxide gas is formed.

8. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with an aqueous solution containing sodium sulphite and an alkali capable of producing carbon dioxide during the period of digestion, providing a charge of carbon dioxide in the initial digestion mixture, and boiling the wood under pressure.

9. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with an aqueous solution containing sodium sulphite and sodium carbonate capable of producing carbon dioxide during the period of digestion, providing a charge of carbon dioxide in the initial digestion mixture, and boiling the wood under pressure.

10. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with a non-acid aqueous solution containing a sulphite and an alkali capable of producing carbon dioxide during the period of digestion, providing a charge of carbon dioxide in the initial digestion mixture, boiling the wood and chemicals under pressure and in a condition of non-acidity during which boiling treatment carbon dioxide gas is formed, the total amount of sulphite and alkali in proportion to the dry material of the wood being less than twenty pounds of sulphite and less than ten pounds of alkali for each one hundred pounds of oven dry material in the wood.

11. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with an aqueous solution containing sodium sulphite and an alkali capable of producing carbon dioxide during the period of digestion, providing a charge of carbon dioxide in the initial digestion mixture, and boiling the wood under pressure, the total amount of sodium sulphite and alkali present in proportion to the dry material of the wood being less than twenty pounds of sulphite and less than ten pounds of alkali for each one hundred pounds of oven dry material in the wood.

12. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with an aqueous solution containing sodium sulphite and sodium carbonate capable of producing carbon dioxide during the period of digestion, providing a charge of carbon dioxide in the initial digestion mixture, and boiling the wood under pressure, the total amount of sodium sulphite and sodium carbonate present in proportion to the amount of dry material of the wood being less than twenty pounds of sulphite and less than ten pounds of carbonate for each one hundred pounds of oven dry material in the wood.

13. In the process of manufacturing pulp and in the preliminary treatment of wood prior to mechanical disintegration, the steps which include treating the wood by digesting it in a non-acid aqueous solution including sodium sulphite and a weak alkali capable of producing carbon dioxide during the period of digestion, providing a charge of carbon dioxide in the initial digestion mixture, boiling the wood and chemicals under pressure and in a condition of non-acidity during which boiling treatment carbon dioxide gas is formed, and controlling the alkalinity of the solution by the release of suitable amounts of carbon dioxide and steam during the boiling period.

14. In the process of manufacturing pulp and in the preliminary treatment of wood prior to mechanical disintegration, the steps which include treating the wood by digesting it in a non-acid aqueous solution including a sulphite and an alkali capable of producing carbon dioxide during the period of digestion, providing a charge of carbon dioxide in the initial digestion mixture, boiling the wood and chemicals under pressure and in a condition of non-acidity during which boiling treatment carbon dioxide gas is formed, and controlling the alkalinity of the solution by the release of suitable amounts of carbon dioxide and steam during the boiling period.

15. In a process of manufacturing pulp and in the preliminary treatment of wood prior to mechanical disintegration, the steps which include treating the wood by digesting it in a non-acid aqueous solution including a sulphite and an alkali capable of producing carbon dioxide during the period of digestion, providing a charge of carbon dioxide in the initial digestion mixture, boiling the wood and chemicals under pressure and in a condition of non-acidity during which boiling treatment carbon dioxide gas is formed, and effecting the dissolving of coloring material present by maintaining alkalinity and avoiding acidity by releasing carbon dioxde and steam from the digesting apparatus during the boiling period.

16. In the process of manufacturing pulp, the steps of preparing the wood for mechanical treatment which consists in treating wood so as to dissolve the intercellular material without materially decomposing the ligno cellulose content of the wood by subjecting it to a steaming treatment and afterward subjecting it to a chemical treatment consisting of digestion with a non-acid aqueous solution containing a sulphite and a carbonate capable of producing carbon dioxide during the period of digestion, providing a charge of carbon dioxide in the initial digestion mixture, boiling the wood and chemicals under pressure and in a condition of non-acidity during which boiling treatment carbon dioxide gas is formed, and releasing carbon dioxide and steam during the boiling period, the total amount of sulphite and carbonate present in proportion to the amount of dry material of the wood being less than twenty pounds of sulphite and less than ten pounds of carbonate for each one hundred pounds of oven dry material in the wood.

In testimony whereof I affix my signature.

FRANCIS G. RAWLING.